Figure 1:
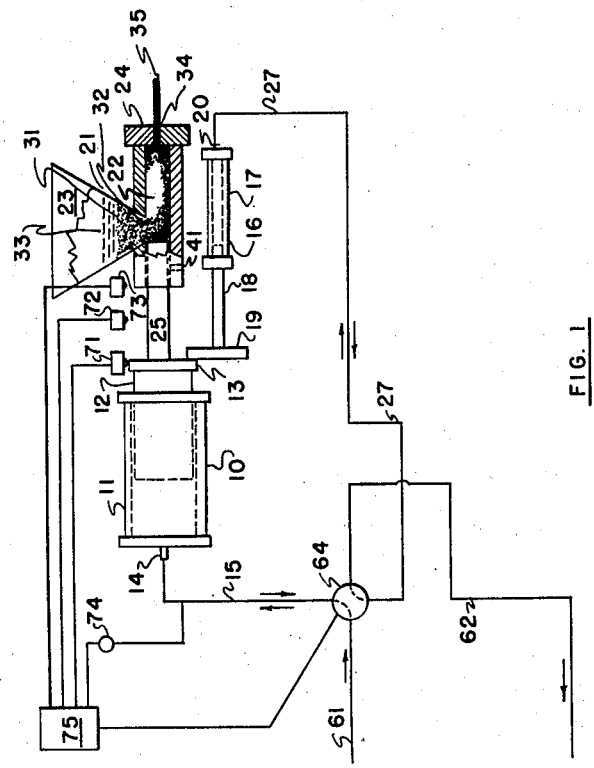

Nov. 17, 1959  H. A. THOMAS  2,912,827
TREATING HIGH SOLIDS SLUDGES
Filed Dec. 20, 1957  2 Sheets-Sheet 1

United States Patent Office 2,912,827
Patented Nov. 17, 1959

2,912,827
TREATING HIGH SOLIDS SLUDGES

Henry A. Thomas, Baton Rouge, La., assignor to Ethyl Corporation, New York, N.Y., a corporation of Delaware Application December 20, 1957, Serial No. 704,064

3 Claims. (Cl. 60—97)

This invention relates to apparatus for deliquefying high solids sludges, wherein the solids are malleable metals such as lead, and for the concurrent extrusion of the solids as a cohesive, bar-like shape. More specifically, the invention relates to an improved apparatus of this type including, in combination, control means which integrates the movements and functions of said press by application of driving forces applied by a hydraulic actuating mechanism.

It has been found that certain high solids sludges, wherein the solids are finely divided malleable or easily deformable metals such as lead, are susceptible to a very efficient deliquefication and concurrent formation of the solids content as an extruded bar. This is accomplished by applying pressure to the sludge in an extrusion chamber and forcing the solids through an extrusion die. The operation is quite effectively performed in a ram type extrusion press, i.e., one wherein a plunger or ram is employed which is capable of moving back and forth in an extrusion chamber or barrel which is closed at the discharge end by a die plate having a die therein of smaller diameter than the extrusion chamber proper. It is further found that a high degree of production is achieved by cumulating a series of charges in the extrusion chamber prior to extrusion. This is accomplished by filling the extrusion chamber and then applying a moderate pressure upon the charge. The moderate pressure application is only sufficient to provide some deliquefaction of the sludge without deformation of the solids thereof. Following this, the extrusion chamber is again filled to the extent of deliquefication and pressure again applied to the charge. The process is repeated, the number of repetitions dependent upon the nature of the sludge. Such a series of cumulated charges is followed by the application of appreciably greater pressures, sufficient to cause plastic deformation of the solids in the extrusion thereof through the die. Customarily, the motivating force for the operation of extrusion devices of this character has been hydraulic motors, viz., hydraulically actuated cylinder-piston units operatively engaged with the ram or plunger of the extrusion machine. In carrying out the operation, it is quite feasible to control the reciprocating motivating movement of the hydraulic motor system by manual manipulation of the supply of hydraulic fluid to the cylinder-piston units of the hydraulic motor. In other words, manual closure and reversal of the appropriate valves is provided. However, although this technique is perfectly operable, it leaves much to be desired in that the uniformity of timing and rapidity of the cyclic operations provided is susceptible to wide variation. In addition, reliance upon manual control for each reciprocating impulse of an operating cycle leaves much to be desired in that the operating labor requirements are appreciable.

It is, accordingly, an object of the present invention to provide a new and improved apparatus for the automatic and repetitive processing of high solids sludges, especially lead containing sludges according to the process mentioned above. More specifically, an object of the present invention is to provide, in combination, a reciprocating ram type extrusion press, a hydraulic actuating mechanism therefor, and a control system in conjunction therewith. Even more specifically, an object of the present invention is to provide apparatus of the above character wherein control means are provided to differentiate and automatically provide for application of pressure for an initial cumulating and pretreating operation characterized by moderate pressure application, and a final or high pressure working and extrusion stroke. A further more specific object of certain embodiments is to provide a combination of apparatus including an extrusion machine of the reciprocating plunger type, a hydraulic motor system which is particularly capable of providing rapidity of action for the pretreating operations and cumulation of charges at low pressures, followed by a high pressure operation, in conjunction with a control system therefor. Other objects will appear hereinafter.

Figure 2:
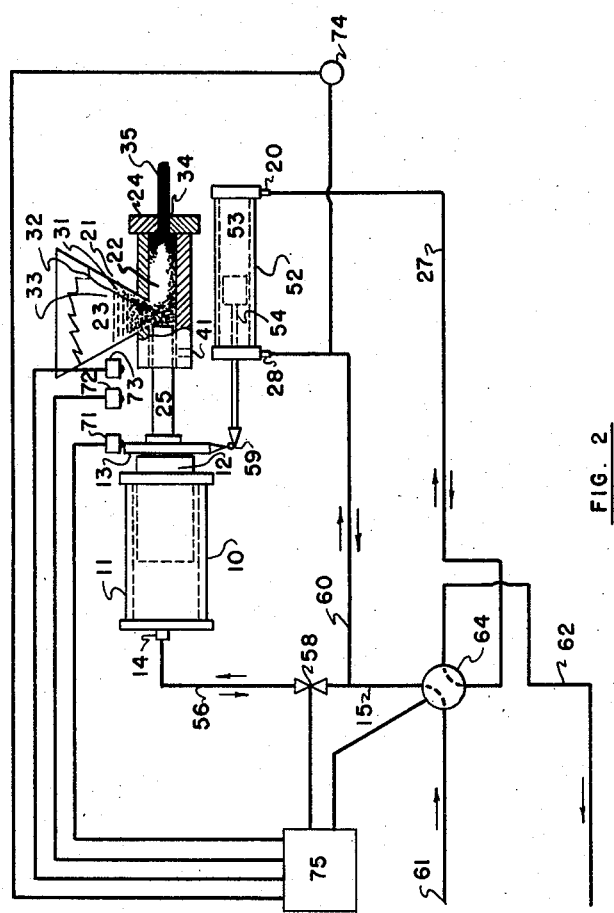

A full understanding of the invention and the apparatus thereof will be provided from the description below and the accompanying figures, wherein Figure 1 is a schematic representation of one embodiment of the apparatus of the invention wherein a single-acting hydraulic cylinder-piston unit is employed for providing all the strokes of the extrusion machine plunger in the working direction, i.e., in the direction tending to force the solids through the extrusion die. Figure 2 is a preferred and even more effective embodiment wherein the hydraulic powering system includes a hydraulic cylinder-piston unit of relatively large diameter, for providing a working stroke of relatively high magnitude (while utilizing a common pressure hydraulic liquid supply) and also a hydraulic cylinder-piston unit or motor of the double-acting type. This latter motor is usually of a smaller diameter, and is also operatively engaged with the ram of the extrusion machine for providing reciprocating action. As will be readily apparent, such a smaller diameter unit is capable of providing an appreciably higher linear movement rate than the aforementioned main hydraulic cylinder-piston unit, when supplied with hydraulic liquid at the same volumetric rate.

As already indicated, the apparatus of the invention includes in combination an extrusion machine of the reciprocating plunger or ram type, an appropriate hydraulic actuating mechanism including at least two hydraulic motors or cylinder-piston units for providing the reciprocating action of the extrusion machine ram, a hydraulic supply system, and a control system in conjunction therewith. It will be understood that, in all forms of the invention, a source of pressurized hydraulic liquid is essential. The control system includes valve means and switch means. By switch means is meant pressure or position responsive devices capable of being operatively connected to the valve means, whereby a signal from the switch means can be employed to cause desired repositioning of the valve means. However, the control system shall be taken to include said switch means operatively connected through an electrical relay actuator to a motor valve means whereby fluid flow therethrough can be terminated or reversed. The details of the apparatus of the invention and its operation will be most readily understood from the detailed description below.

Referring to Figure 1, the principal parts of the apparatus include an extrusion press 21, of the reciprocating ram type, and a hydraulic actuating mechanism consisting of a main cylinder-piston unit 11, and a supplemental cylinder-piston unit 16. Hydraulic fluid supply lines 15, 27 are connected to a high pressure manifold 61 and a low pressure manifold 62, through a four-way valve 64. The automatic control devices of the apparatus include a pressure actuated controller 74, three position actuated controllers 71, 72, 73 operatively engaged through, for example, an electrical relay 75 which controls and integrates the movements and functions of the said extrusion press and fluid actuating motor system by reversing the flow of hydraulic fluid in response to signal impulses from the controllers, as described hereinafter.

The extrusion press 21 includes an extrusion chamber 22 wherein there is mounted for sliding fit a mating ram 25. Communicating with the extrusion chamber 22 is a feed hopper 23 which provides a supply of the high solids sludge 31 to be processed for feeding through a feed port 32 in the wall of the extrusion press 21. In many operations, a layer of liquid 33 is maintained above the solids content of the sludge 31 within the feed hopper 23. The end of the extrusion chamber 22 is capped by a die assembly 24 having an aperture or die 34 therein of smaller transverse area than the extrusion chamber 22 proper.

It will be seen that in operation movement of the ram 25 toward the die assembly 34 will force the solids of the charge of high solids sludge through the aperture or die 34 of the die assembly 24, providing sufficient pressure as is exerted.

A main cylinder-piston unit or motor 11 includes a cylinder 10 with a ram or single acting piston 12, closely fitted therein for sliding movement. The piston 12 makes contact with the end of the ram 25 of the extrusion press 21. The piston 12 bears against a platen 13 affixed to the end of the ram 25. Guide rods or bars (not shown) are provided to assure movement of the platen 13, and the ram 25, on a straight horizontal path. The main cylinder piston unit cylinder 10 is fitted with a hydraulic liquid supply nozzle 14. The nozzle is joined to a supply conduit 15 for feed or discharge of the appropriate hydraulic actuating liquid.

A supplemental cylinder-piston unit 16 includes a cylinder 17, generally of appreciably smaller transverse dimensions than the cylinder 10 of the main cylinder-piston unit 11. A single acting piston 18 is slideably positioned therein. A nozzle 20 is fitted to the end of the cylinder 17 and is connected to a conduit 27 which is provided to supply or discharge the actuating hydraulic liquid. On the end of the piston 18 of the supplemental cylinder piston unit 16 is a connecting bracket 19 which is normally attached to the platen 13 at the end of the ram 12.

The hydraulic system includes a four-way valve 64 which connects the two conduits 15, 27 which supply or discharge liquid to or from the hydraulic motors or fluid actuating mechanism 11, 16. The feed is from a high pressure manifold 61 and discharge is to a low pressure manifold or return conduit 27. It will be readily seen that two liquid flow routes are provided. When the high pressure manifold 61 is connected by the four-way valve 64 to conduit 15 (as shown) to the main cylinder-piston unit 11, the line or conduit 27 from the supplemental cylinder-piston unit 16 is connected to the low pressure manifold 62. Feed of hydraulic liquid from a supply pump (not shown) then provides outward movement of the piston 12, causing movement of the ram 25 toward the die 34. Concurrently, the piston 18 of the supplemental cylinder-piston unit 16 is pushed back into the cylinder 17. This causes expulsion of the hydraulic liquid through line 27 and the channel of the four-way valve 64 into the low pressure manifold 62. When the four-way valve 64 is reversed, connecting the high pressure manifold 61 to the conduit 27 to the supplemental cylinder-piston unit 16, flow of hydraulic liquid causes outward movement of the piston of the supplemental cylinder-piston unit 18. This movement withdraws or retracts the extrusion ram 25 to a position remote from the die plate 24 and concurrently returns the piston 12 of the main cylinder-piston unit 11 into the cylinder 10. This movement further expels hydraulic liquid from the main cylinder-piston unit 11 through the conduit 15 into the low pressure conduit 62.

Hydraulic liquid is supplied, as mentioned, from an appropriate pressure source, such as a constant flow positive displacement pump. It is seen that repositioning of the four way valve 64 will provide a reversal of movements of the singly acting pistons 12, 18 of the hydraulic motors 11, 16 and also of the extrusion ram 25. For convenience, movement of the extrusion ram 25 toward the extrusion plate 24 is hereafter referred to as a "working stroke," and movement in the reverse direction is referred to as a "retracting stroke." When a constant displacement hydraulic pump is employed, it will be seen that the linear rapidity of movement in a working stroke is much less than during a retracting stroke. This disparity accompanies the substantial difference in transverse area of the piston 12 of the main cylinder-piston unit 11 and the piston 18 of the supplemental cylinder-piston unit. Operation of the piston 18 of the supplemental cylinder-piston unit 16, in this embodiment, needs to provide only enough force to overcome mechanical and hydraulic friction of a retracting stroke, and hence, the transverse area of the piston can be moderate.

Turning to the control apparatus included in this embodiment, included are a pressure actuated or responsive controller 74 and three position actuating controllers. A variety of devices can be employed as actuating controllers. Generally, it is preferred to use, for the position-actuating controllers, small actuating controllers of the "Microswitch" type such as manufactured by the General Electric Company. These actuating controllers include a small protuberance which will close a desired circuit upon only minute displacement. By positioning these switches to engage a portion of the reciprocable parts of the apparatus, then, a desired circuit can be established with great accuracy in response to the position of the extruder ram 25. The pressure actuating controller 74 may also incorporate a "Microswitch" in conjunction with a pressure deformable membrane, so that attainment of a desired pressure will actuate the controller and close a desired circuit. The position switches include a maximum forward controller 73, a maximum retraction controller 71, and an intermediate position controller 72. The maximum forward controller 73 is positioned to be actuated when the end of the extrusion ram 25 attains a position near the die plate 24. On the other hand, the maximum retraction controller 71 is actuated when the ram 25 is retracted past a feed port or opening 32 from the feed hopper 23 into the extrusion chamber 22. An intermediate position controller 72 is located at a position for actuation when the end of the ram 25 is positioned slightly past the feed port 32. The pressure controller 74 is positioned to be responsive to the attainment of a preselected pressure in the liquid supply line 15 to the main cylinder-piston unit 11.

In conjunction with the controllers, an electrical relay actuator mechanism 75 is provided. The relay actuator 75 is operatively connected to the four-way valve 64. In response to a signal from either the pressure controller 74, or the maximum forward or maximum retraction controllers 73, 71 the relay actuator 75 reverses the position of the four-way valve 64, thereby reversing the hydraulic liquid supply flow to the hydraulic actuating mechanism 11, 16 and causing a reversal of movement of the pistons 12, 18 of the main cylinder-piston unit 11 and the supplemental cylinder-piston unit 16.

The intermediate position controller 72, in contrast to the other two position controllers 71, 73 and the pressure controller 74, is not wired to cause (in conjunction with the relay actuator 75) reversal of the four-way valve 64. Instead, when the intermediate position-controller 72 is actuated by the position of the extrusion ram 25, it prevents the normal valve reversal which would occur if the pressure controller 74 were actuated at the same time.

OPERATION, FIG. 1 MODIFICATION

The operation interrelation of the above described control mechanisms will be readily understood by description of a full operating cycle. Referring to Figure 1, the ram 25 is shown in full retracted position, which permits introduction of raw sludge 31, with usually some accompanying liquid from the liquid layer 33, from the feed hopper 23 into the chamber 22. At the maximum retracted position of the ram 25, as shown, the position controller 71 causes repositioning of the four-way valve 64 to feed hydraulic liquid to the cylinder 10 of the main cylinder-piston unit 11. Under the influence of this liquid flow, the piston 12 pushes the extrusion ram 25 toward the die plate 34. Concurrently, the piston 18 of the supplemental cylinder-piston unit is moved into the cylinder 17, causing discharge of hydraulic liquid through line 27.

As the ram 25 moves the sludge charge toward the discharge end of the extrusion chamber 22, the solids particles of the sludge are moved closer together. Concurrently, a portion of the original liquid content is removed by being expressed around the face of the ram 25 where it is removed from the press 21 by draining through a port 41, in the chamber 22. As this deliquefying occurs, resistance to movement of the ram 25 increases, and consequently, the pressure increases in the hydraulic liquid supply line 15. The pressure controller 74 is set to be responsive to an intermediate pressure which is appreciably lower than the pressure attainable from the hydraulic liquid supply source. Also, this pressure corresponds to a force application, by the ram 25, which is appreciably below the force required to extrude the lead solids through the die 34. Thus, in a typical embodiment, the pressure controller 74 is actuated upon attainment of a pressure of from about 500 to about 2000 pounds per square inch, when the maximum available pressure which can be generated by the hydraulic system is of the order of from about 11,000 to about 20,000 pounds dependent upon the extrusion ratio. Upon attainment of this pressure, the four-way valve 64 is again reversed, by the operation of the relay-activator 75, and the hydraulic liquid is fed to the supplemental cylinder-piston unit 16. This reverses the movement of the reciprocating parts. As the ram 25 is retracted to the maximum retracted position, the maximum retracted controller 71 is again closed, causing a reversal of the four-way valve 64 and thus starting an additional working stroke. This second working stroke is terminated after shorter travel than the first stroke, upon attainment of the intermediate pressure. The shorter stroke results from the fact that the extrusion chamber 22 is partially filled with the partly deliquefied solids remaining from the first working stroke. Several additional repetitions of this cycle can follow, each of the working and retraction strokes being of more limited extent as the amount of solids is accumulated. Finally, the intermediate pressure during a working stroke is attained at the same position or point where the intermediate controller 72 negates the normal operation of the pressure controller 74. Thence, the four-way valve 64 is not reversed, and maximum line pressure is applied in the main cylinder-piston unit 11, resulting in application of an extrusion producing force by the ram 25. The solids are thus extruded as a substantially homogeneous rod 35, this extrusion working stroke being terminated upon actuation of the maximum forward controller 73.

The operation of the embodiment of Figure 1, as described above, is highly effective in providing for repetitious automatic and extended operation. As already noted, the rapidity of linear movement of the reciprocating parts is appreciably greater during the retracting movement, because of the relatively small diameter of the piston 18 of the supplemental cylinder-piston unit 16. Thus, in a typical situation, the linear movement on retraction is from about 10 to about 40 times the rate of linear movement during a working stroke. This great difference in rapidity of movement is of no great consequence when a small number of charges of partly deliquefied sludge solids are cumulated prior to extrusion. However, in those instances wherein maximum effectiveness in rapidity of operation is particularly desired, the application of the invention can be further defined as is illustrated in the embodiment generally illustrated by Figure 2. This embodiment describes an automated ram type press wherein the extruder ram is cycled through at least one, usually a series, of low pressure charge cumulating strokes prior to the use of a hydraulic cylinder-piston unit of large diameter to provide a force of higher magnitude to effect an actual extrusion.

Referring to Figure 2, it will be noted that the major elements of the apparatus in combination again include a ram-type extrusion press 21, a main hydraulic motor or hydraulic cylinder-piston unit 11, a reversing four-way valve 64, and a relay actuator mechanism 75. In addition, appropriate conduits as hereafter described are provided. In contrast to the embodiment of Figure 1, however, the supplemental motor is a double-acting cylinder-piston unit, or double-acting hydraulic motor 52.

A high pressure manifold 61 is provided to convey hydraulic liquid from a suitable pump or supply source (not shown) to the four-way valve 64. A low pressure manifold 62 also connects to the four-way valve 64 for the return of hydraulic liquid at low pressure to the hydraulic pump. The conduit 15 leading from the four-way valve 64 branches into a conduit 56 and an additional conduit 60, these conduits leading respectively to the nozzle 14 which feeds the main cylinder-piston unit 11, and to the nozzle 28 feeding to one side of the piston 54 of the double-acting cylinder-piston unit 52. The point of introduction of this conduit 60 to the cylinder-piston unit 52 is such as to provide movement of the piston 54 in the same direction as would be provided by feeding liquid to the main cylinder-piston unit 11. An additional line 27 is provided for connecting the four-way valve 64 to the opposite end of the hydraulic motor 52, hydraulic liquid when supplied through this conduit tending to provide movement of the double-acting piston 54 in a reverse direction to the movement of which the piston 12 of the main hydraulic cylinder-piston unit 11 is susceptible by supply of hydraulic fluid to that unit.

As in the other embodiment, the control elements of the apparatus include a maximum retracted position controller 71, a maximum forward position controller 73, a pressure controller 74, and an intermediate position controller 72. All of the said controllers are operatively connected to the relay-actuator mechanism 75 as hereafter described. The pressure controller 74 is responsive to the pressure in the line 60 used for supplying hydraulic liquid to the supplemental double-acting cylinder-piston unit 52. An on-off valve 58 is provided in line 56, the said valve being responsive to and actuated by the relay actuator mechanism 75 as described hereafter.

Considering generally the capabilities of movement of the several reciprocatable parts of the combination, it will be seen that the ram 25 of the extrusion press 21 is capable of being reciprocated by reciprocating movement of the piston 54 of the double-acting cylinder-piston unit 52. In addition, it will be clear that movement of the piston 12 of the main hydraulic cylinder-piston unit 11 outwardly of the cylinder 10 will provide thrust of the extrusion ram 25 in a working stroke direction. Owing to the relatively small diameter of supplemental cylinder-piston unit 52, supply of hydraulic liquid to either end of the cylinder 53 of this unit will provide reciprocating action at a linear rate appreciably in excess of the linear rate of movement capable of attainment by the piston 12 of the main cylinder-piston unit 11 upon supply of hydraulic liquid at the same volumetric rates.

The interrelation of the above apparatus and control mechanism will be readily understood from the following description of a typical cycle of operation.

OPERATION, FIG. 2 MODIFICATION

In operation, the extruder press, ram 25 of the apparatus of Figure 2, is retracted sufficiently to permit a first charge of the sludge 31, and usually some of the liquid layer 33, to be introduced into the extrusion chamber 22. While the piston 12 of the cylinder piston unit 11 is held immobile by closure of the valve 58, forward movement of the ram 25 is initiated. This is accomplished by the flow of pressurized hydraulic fluid through the nozzle 28 into the cylinder 53 of the double-acting supplemental cylinder-piston unit 52. As the ram 25 moves the sludge charge toward the discharge end of the extrusion chamber 22, the solids particles of the sludge are moved closer together and a portion of the liquid content is expressed around the face of the ram 25 and out of the press through the port 41. As deliquefication continues, resistance to the movement of the ram 25 increases, and consequently, the pressure within the conduit 60 also increases. The pressure controller 74 is set to be responsive to an intermediate pressure which is usually somewhat lower than the pressure attainable from the hydraulic liquid supply source. This predetermined pressure also corresponds to a force application by the ram 25, which is considerably below the force required for extruson. Upon attainment of this predetermined pressure, the pressure controller 74, through the operation of the relay actuator 75, repositions the four-way valve 64. (The valve 58 to the main hydraulic motor remains closed during this period.) The flow of hydraulic fluid to the supplemental cylinder-piston unit 52 is thereby reversed. This reverses the movement of the ram 25, by causing pressurized hydraulic fluid to flow through the supply nozzle 20 into the opposite side of the cylinder 53, causing projection of the piston 54 which retracts the ram 25. Concurrently hydraulic fluid flows out of the opposite side of the cylinder 53 through supply nozzle 28. As the maximum retracted position of the ram 25 is neared, a fresh charge is introduced from the feed hopper 23 through the feed port 32 into the extrusion chamber 22. At the maximum retraction position the controller 71 causes repositioning of the four-way valve 64. Pressurized hydraulic fluid now again flows through supply nozzle 28 into the cylinder 53 and the ram 25 is again thrust forward. The cycle is repeated a number of times until a sufficient deliquefied solids mass has been cumulated within the chamber 22. At this condition or point of time the ram 25, because of the partly deliquefied solids mass within the chamber 22, is in contact with the intermediate position controller 72, and when the predetermined set pressure is attained within the conduit 60 the ordinary reversal of the four-way valve 64 by the relay actuator 75 does not occur. Instead, when the intermediate position controller 72 is activated it negatives the effect of the pressure controller 74 and causes opening of the valve 58. Pressurized hydraulic fluid now flows through line 56, supply nozzle 14 and into the main cylinder-piston unit 11. Under this influence the piston 12 is thrust forward against the extrusion ram 25 and forces it toward the die plate 34. This produces an extrusion of the solids lead particles as a cohesive solid shape 35 through the die 34. Concurrently the piston 54 of the supplemental cylinder piston unit 52 is moved into the cylinder 53 causing discharge of hydraulic liquid through line 27. As the ram 25 reaches the discharge end of the extrusion chamber 22, the maximum forward position controller 73, through the relay actuator 75, causes repositioning of the four-way valve 64. The flow of hydraulic fluid is reversed. Pressurized hydraulic fluid is again forced into the opposite side of the cylinder 53 through supply nozzle 20 causing projection of the piston 54 and causing the retraction of ram 25 and piston 12 of the main cylinder piston unit 11. A fresh charge of sludge 31, and accompanying liquid 33 is introduced into the extrusion chamber 22 as the ram 25 clears the feed port 32. At the maximum retraction position the maximum retraction position controller 71, through activation of the relay actuator 75, closes the valve 58 and repositions the four-way valve 64. The cycle is thus complete.

The following examples are given to illustrate typical embodiments of the process of the invention. "Pressure," as used in the following means pressure in pounds per square inch, and compositions are in weight percentages. A typical high solids sludge is a lead solids sludge containing tetraethyllead. Such a supply of sludge of the following composition was provided within the feed hopper 23:

Leads particles _____ 83
Aqueous phase _____ 12
Tetraethyllead _____ 5

The lead was in the form of finely divided particles varying in size from about 0.005 to about 0.05 of an inch in diameter. A surmounting layer of water was maintained above the wet sludge solids in the feed hopper 23 during the operation. In both of the following examples, the sludge was fed into a ram type extrusion press which provided an extrusion ratio of 7:1. The intermediate pressure applied to the charge in both examples was 500 pounds and the extrusion pressure was 14,500 pounds.

The following example exemplifies the most preferred method of operation, as was explained by reference to Figure 2.

*Example 1*

This method cumulates a series of three deliquefied charges within the extrusion chamber 22 by the independent reciprocation of the ram 25 prior to an actual extrusion of the cumulated charges wherein the large piston 12 is employed.

The sludge was introduced into the extrusion chamber 22 and a pressure of approximately 500 pounds applied to the charge by the ram 25. Under this force, about 75 percent of the liquid initially present was removed from the charge. This reduced the sludge to about one-third of its original volume. At this pressure the pressure controller 74 was activated and the four-way valve 64 reversed. The ram 25 was withdrawn and the extrusion chamber 22 again filled to the extent of deliquefication. A series of two additional cycling strokes followed. At the end of the third stroke however, when the pressure of 500 pounds was attained the ram 25 was in contact with the intermediate controller 72 and the ordinary reversing action of the pressure controller 74 did not occur. Instead the closure valve 58 was opened and the main piston 12 was thrust forward against the ram 25. The pressure applied by the piston 12 and ram 25 was increased to about 14,500 pounds at this time. This pressure was accompanied by further removal of substantially all the remaining liquid phases and by the transmittal through the extrusion die 34 of an apparently homogeneous solid bar-like product 35. As the ram 12 came into contact with the forward maximum controller 73 the actuator controller 75 again reversed the four-way valve 64 and the direction of motion of the reciprocating parts was reversed. As the ram 25 cleared the feed port 32, a fresh charge of sludge was again introduced into the extrusion chamber 22. At the maximum retraction position of the ram 25 the maximum retraction controller 71 through the relay actuator 75 closed the valve 58 and repositioned the four-way valve 64. This completed the cycle.

The following example is the same as the foregoing example in all respects except that there are no working strokes applied by the independent reciprocation of the ram 25. Instead the ram 25 and piston 12 are reciprocated as a unitary device.

*Example II*

A charge of sludge was introduced into the extrusion chamber 22. The piston 12 and ram 25 by applying a 500 pound pressure reduced the volume of the sludge to one-third of its original volume. At this pressure the pressure controller 74 was activated, and through the relay actuator 75 the four-way valve 64 was repositioned. The flow of hydraulic fluid was reversed and the direction of motion of the reciprocating parts was reversed. Near the maximum retraction position a fresh charge of sludge filled the chamber 22 to the extent of the prior deliquefication. At the maximum retraction position, the maximum retraction controller 71, through the relay actuator 75 again reversed the four-way valve 64. A second and a third 500 pound compressive force was applied by the piston 12 and ram 25. At the end of the third application however, when the pressure of 500 pounds was attained the ram 25 was in contact with the intermediate switch 72 and the ordinary reversing action of the pressure controller 74 did not occur. This permitted pressure to continue to mount within the system and the piston 12 and ram 25 continued forward until at a pressure of 14,500 pounds extrusion ensued. When the forward maximum controller 73 was activated the valve 64 was again repositioned and the cycle repeated.

While it is now apparent that the preferred embodiments of the invention herein disclosed are well calculated to fulfill the objects herein stated it will be apparent that some modifications of the apparatus can be made without departing from the spirit and scope of the invention. For example, while the control apparatus finds particularly advantageous application in the art of extruding high solids lead sludges and the like, as suggested in the foregoing, the apparatus may nevertheless be employed with any reciprocating ram type fluid actuated press processing many types of materials. Modifications may be made also with regard to the type of control apparatus applied. For example, the controllers are not necessarily limited to electrical switches and need not employ an electrical actuator controller to open and close valves. The same principles herein shown might easily be applied to pneumatic instruments and controls or to a more complex mechanical system of controls. Many other changes such as variations in the intermediate pressure applications, extrusion pressures, nature of the material processed, etc. may be altered without departing from the spirit and scope of the invention.

What is claimed is:

1. A hydraulic actuating mechanism and a control apparatus therefor, for a reciprocable, driven device, the hydraulic actuating mechanism being actuated by hydraulic liquid supplied from a pressure source, and including at least two hydraulic cylinder piston units operatively engaging the driven device for providing reciprocating motion thereto, conduits between the pressure source and the hydraulic cylinder piston units to allow reversible flow of hydraulic liquid thereto, and valve means capable of reversing flow, the control means including a pressure controller responsive to a preselected pressure of the hydraulic liquid, and three position actuated controllers, the first said position actuated controller being responsive to a maximum forward position of the said driven device, the second position actuated controller being responsive to a maximum retracted position of said driven device, and the third position actuated controller being responsive to a preselected intermediate position of said driven device, the said first controller being operatively engaged with said valve means for reversal of hydraulic liquid flow upon attainment of the said maximum forward position, the said second controller being operatively engaged with the said valve means to reverse flow of hydraulic liquid upon attainment of the said maximum retracted position, the pressure responsive controller being operatively engaged with the valve means to reverse hydraulic liquid flow upon attainment of a predetermined hydraulic system pressure, the third position actuated controller being operatively engaged to negative the reversing action of the pressure actuated controller when activation thereof by the predetermined hydraulic system pressure coincides with the activation of the said third controller at a preselected intermediate position, whereby the maximum pressure is then applied to the said reciprocable driven device.

2. A hydraulic actuating mechanism and a control apparatus therefor for a reciprocable, driven device, the hydraulic actuating mechanism being actuated by hydraulic liquid supplied from a pressure source, and including a single acting main cylinder-piston unit for supplying working strokes and at least one single acting supplemental cylinder-piston unit parallel to the said main cylinder-piston unit and operating in the reverse direction thereto, for repositioning of the piston of said main unit after a working stroke, both of said units being operatively engaged to the driven device, conduits between the pressure source and the hydraulic cylinder-piston units to provide reversible flow of hydraulic fluid thereto and valve means capable of reversing flow, the control means including a pressure controller responsive to a preselected pressure of the hydraulic liquid applied to the main cylinder-piston unit, and three position actuated controllers, the first, second and third position actuated controllers being responsive to a maximum extended position, a maximum retracted position, and a preselected intermediate position, respectively, of the piston of the main cylinder-piston unit, the said first controller being operatively engaged with the valve means for reversal of hydraulic liquid flow upon attainment of the said maximum extended position, the said second controller being operatively engaged with the valve means for reversal of hydraulic liquid flow upon attainment of said maximum retracted position, the pressure actuated controller being operatively engaged with the valve means to reverse hydraulic liquid flow upon attainment of a predetermined hydraulic system pressure, the third position actuated controller being operatively engaged to negative the reversing action of the pressure controller when activation thereof by the predetermined hydraulic system pressure coincides with the activation of the said third controller at said preselected intermediate position, whereby the maximum pressure is then applied to the main cylinder piston unit.

3. A hydraulic actuating mechanism and a control apparatus therefor for a reciprocable, driven device, the hydraulic actuating mechanism being actuated by hydraulic liquid supplied from a pressure source, and including a single acting main cylinder-piston unit for supplying a high force working stroke and at least one double acting supplemental cylinder-piston unit, parallel to the said main cylinder-piston unit and operatively connected thereto for repositioning the piston of said main cylinder-piston unit after a high force working stroke, and for independently reciprocating the driven device through at least one double stroke including a working stroke and a return stroke, conduits between the pressure source and the hydraulic cylinder-piston units to allow reversible flow of hydraulic liquid thereto, valve means capable of reversing the flow, and a closure valve for controlling the flow of hydraulic liquid to the main cylinder-piston unit, the control apparatus including a pressure controller responsive to a preselected pressure of the hydraulic liquid applied to the double acting cylinder-piston unit during a working stroke, and three position actuated controllers, the first and second said position actuated controllers being responsive to a maximum extended position and a maximum retracted position, respectively, of said driven device, the pressure actuated controller being operatively engaged with valve means to reverse liquid flow upon attainment of a predetermined hydraulic system pressure, the third position actuated control being operatively engaged to negative the reversing action of the pressure actuated controller and to open the said closure valve allowing flow of hydraulic liquid to the main cylinder-piston unit, when activation of the pressure actuated controller by the predetermined hydraulic system pressure coincides with the activation of the third position actuated controller at the said preselected intermediate position, whereby the piston of the main cylinder-piston unit is thrust forward and applied to the driven device for a high force working stroke.

References Cited in the file of this patent

UNITED STATES PATENTS

| | | |
|---|---|---|
| 1,911,138 | Clute et al. | May 23, 1933 |
| 2,191,882 | Ernst et al. | Feb. 27, 1940 |
| 2,277,640 | Harrington | Mar. 24, 1942 |
| 2,497,608 | Herrstrum et al. | Feb. 14, 1950 |